United States Patent
Sato et al.

(10) Patent No.: US 12,183,928 B2
(45) Date of Patent: Dec. 31, 2024

(54) POSITIVE ELECTRODE ACTIVE MATERIAL

(71) Applicant: HONDA MOTOR CO., LTD., Tokyo (JP)

(72) Inventors: Kazuyuki Sato, Saitama (JP); Takeshi Fujino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 17/450,286

(22) Filed: Oct. 8, 2021

(65) Prior Publication Data

US 2022/0115669 A1    Apr. 14, 2022

(30) Foreign Application Priority Data

Oct. 12, 2020   (JP) ................................. 2020-171725

(51) Int. Cl.
| | |
|---|---|
| *H01M 4/525* | (2010.01) |
| *H01M 4/36* | (2006.01) |
| *H01M 4/505* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/628* (2013.01); *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
CPC .. H01M 10/0525; H01M 4/628; H01M 4/525; H01M 4/366; H01M 2004/028
See application file for complete search history.

(56) References Cited

U.S. PATENT DOCUMENTS

| | | |
|---|---|---|
| 2009/0087362 A1 | 4/2009 | Sun et al. |
| 2010/0221613 A1* | 9/2010 | Ueki ....................... H01M 4/58 |

(Continued)

FOREIGN PATENT DOCUMENTS

| | | |
|---|---|---|
| CN | 101828286 A | 9/2010 |
| CN | 104221190 A | 12/2014 |

(Continued)

OTHER PUBLICATIONS

Notification of Reasons for Refusal issued in the JP Patent Application No. JP2020-171725, mailed on Nov. 28, 2023.

(Continued)

*Primary Examiner* — Haroon S. Sheikh
*Assistant Examiner* — Kan Luo
(74) *Attorney, Agent, or Firm* — CKC & Partners Co., LLC (57) ABSTRACT

To provide a positive electrode active material capable of improving cycle characteristics of a lithium ion secondary battery and achieving a desirable discharge capacity. A positive electrode active material that is an aggregate of lithium compounds each including a lithium-containing transition metal oxide, includes particles having a surface on which a solid film including a plurality of types of lithium salts is formed. The solid film preferably includes a fluorine compound and a phosphorus compound. The solid film preferably contains 70 mol % or more of fluorine atoms with respect to the total number of moles of the fluorine atoms and phosphorus atoms.

4 Claims, 5 Drawing Sheets

(56) References Cited

U.S. PATENT DOCUMENTS

| | | | |
|---|---|---|---|
| 2015/0044552 A1 | 2/2015 | Okita et al. | |
| 2016/0204426 A1* | 7/2016 | Miura | H01M 4/36 |
| 2016/0301063 A1* | 10/2016 | Yukinobu et al. | H01M 4/04 |
| 2017/0077502 A1* | 3/2017 | Kishimoto et al. | H01M 4/36 |
| 2017/0155145 A1 | 6/2017 | Kusachi et al. | |

FOREIGN PATENT DOCUMENTS

| | | |
|---|---|---|
| CN | 105789570 A | 7/2016 |
| CN | 106575764 A | 4/2017 |
| JP | 2008536285 A | 9/2008 |
| JP | 2009099462 A | 5/2009 |
| JP | 2015165463 A | 9/2015 |
| JP | 2015165464 A | 9/2015 |
| JP | 2016136507 A | 7/2016 |

OTHER PUBLICATIONS

Office Action issued in the CN Patent Application No. CN202111181412.6, mailed on Dec. 1, 2023.

\* cited by examiner

POSITIVE ELECTRODE ACTIVE MATERIAL

This application is based on and claims the benefit of priority from Japanese Patent Application No. 2020-171725, filed on 12 Oct. 2020, the content of which is incorporated herein by reference.

BACKGROUND OF THE INVENTION

Field of the Invention

The present invention relates to a positive electrode active material.

Related Art

Conventionally, as secondary batteries having a high energy density, lithium ion secondary batteries are widely used. A lithium ion secondary battery using a liquid as an electrolyte has a structure in which a separator is interposed between a positive electrode including a positive electrode active material and a negative electrode including a negative electrode active material, and a liquid electrolyte (electrolytic solution) is injected.

The lithium ion secondary battery has an issue that cycle characteristics are deteriorated by repetition of charging and discharging. In response to the issue, a technique has been proposed in which a surface of a positive electrode active material is coated with a fluorine compound to suppress side reactions between the positive electrode active material and an electrolytic solution at a high voltage and to improve cycle characteristics (for example, see Patent Document 1).

Patent Document 1: Japanese Unexamined Patent Application (Translation of PCT Application), Publication No. 2008-536285

SUMMARY OF THE INVENTION

In the technique disclosed in Patent Document 1, since the surface of the positive electrode active material is coated with the fluorine compound, the conductivity of lithium ions becomes insufficient, the reaction resistance increases, and the output decreases.

In response to the above issue, it is an object of the present invention to provide a positive electrode active material capable of improving cycle characteristics of a lithium ion secondary battery and achieving a desirable output.

(1) A first aspect of the present invention relates to a positive electrode active material that is an aggregate of lithium compounds each including a lithium-containing transition metal oxide. The positive electrode active material includes particles having a surface on which a solid film including a plurality of types of lithium salts is formed.

According to the invention of the first aspect, it is possible to provide a positive electrode active material capable of improving the cycle characteristics of a lithium ion secondary battery and achieving a desirable discharge capacity.

(2) In a second aspect of the present invention according to the first aspect, the solid film includes a fluorine compound.

The invention of the second aspect enables the stability of a solid film to be improved.

(3) In a third aspect of the present invention according to the first or second aspect, the solid film includes a phosphorus compound.

The invention of the third aspect enables a desirable lithium ion conductivity of a solid film to be obtained.

(4) In a fourth aspect of the present invention according to any one of the first to third aspects, the solid film includes a fluorine compound and a phosphorus compound. The solid film contains 70 mol % or more of fluorine atoms with respect to a total number of moles of the fluorine atoms and phosphorus atoms.

According to the invention of the fourth aspect, it is possible to provide a positive electrode active material capable of achieving desirable cycle characteristics of a lithium ion secondary battery and a desirable discharge capacity.

(5) In a fifth aspect of the present invention according to any one of the first to fourth aspects, the solid film includes a fluorine compound and a phosphorus compound. A molar ratio of fluorine atoms to phosphorus atoms is greater than a molar ratio of the phosphorus atoms to the fluorine atoms, in the solid film formed in a recess of the surface of the particles of the positive electrode active material.

The invention according to the fifth aspect can suppress the penetration of an electrolytic solution into a positive electrode active material.

(6) In a sixth aspect of the present invention according to any one of the first to fifth aspects, the solid film has a thickness of 10 nm or more and 70 nm or less.

According to the invention of the sixth aspect, it is possible to provide a positive electrode active material capable of achieving desirable cycle characteristics of a lithium ion secondary battery.

(7) In a seventh aspect of the present invention according to any one of the first to sixth aspects, the lithium-containing transition metal oxide includes 60 mol % or more of nickel atoms with respect to transition metal.

According to the invention of the seventh aspect, it is possible to provide a positive electrode active material capable of having high capacity and achieving a desirable discharge capacity of a lithium ion secondary battery.

DETAILED DESCRIPTION OF THE INVENTION

An embodiment of the present invention will now be described with reference to the drawings. The present invention is not limited to the following embodiment.

<Lithium Ion Secondary Battery>

A positive electrode active material according to the present embodiment is used as a positive electrode active material for a lithium ion secondary battery. The lithium ion secondary battery according to the present embodiment includes a positive electrode in which a positive electrode active material layer including the positive electrode active material is formed on a positive electrode current collector. In addition to the above, the lithium ion secondary battery includes, for example, a negative electrode in which a negative electrode active material layer is formed on a negative electrode current collector, a separator that electrically insulates the positive electrode and the negative electrode, an electrolytic solution, and a container that houses these. In the container, the positive electrode active material layer and the negative electrode active material layer face each other with the separator interposed therebetween, and a part of the separator is immersed in the electrolytic solution stored in the container.

(Current Collector)

As the material of the positive electrode current collector, for example, a foil-like, plate-like, or mesh-like member of copper, aluminum, nickel, chromium, gold, platinum, iron, zinc, titanium, or stainless steel can be used. As the material of the negative electrode current collector, for example, a foil-like, plate-like, or mesh-like member of copper, aluminum, nickel, titanium, stainless steel, calcined carbon, conductive polymer, conductive glass, or an Al—Cd alloy can be used.

(Electrode Active Material Layer)

The positive electrode active material layer includes a positive electrode active material as an essential component, and may include a conductive auxiliary agent, a binder, and the like. Similarly, the negative electrode active material layer includes a negative electrode active material as an essential component, and may include a conductive auxiliary agent, a binder, and the like. The positive electrode active material layer and the negative electrode active material layer are each formed on at least one side of a corresponding current collector, and may be formed on both sides.

[Positive Electrode Active Material]

The positive electrode active material is an aggregate of lithium compounds including a lithium-containing transition metal oxide. The lithium-containing transition metal oxide is a composite oxide containing a lithium element and a transition metal element. Examples of the lithium-containing transition metal oxide include lithium cobalt composite oxides such as $LiCoO_2$ and $LiCoO_4$, lithium manganese composite oxides such as $LiMn_2O_4$, lithium nickel composite oxides such as $LiNiO_2$, lithium nickel manganese composite oxides, and lithium-containing transition metal oxides such as $LiNi_xCo_yMn_zO_2$ (x+y+z=1) and $LiNi_xCo_yAl_zO_2$ (x+y+z=1). As the lithium compound, a known lithium compound used as a positive electrode active material such as $LiFePO_4$, other than the above materials, may be included.

In the lithium-containing transition metal oxide, it is preferable that the proportion of Ni atoms with respect to the total number of transition metal atoms is 60 mol % or more. Thus, this enables high capacity of the positive electrode active material to be achieved. When the proportion of Ni atoms in the positive electrode active material is large, the volume change caused by charging and discharging increases, and thus the positive electrode active material tends to deteriorate. In the positive electrode active material according to the present embodiment, the deterioration of the positive electrode active material is suppressed by including a solid film (described later), which is preferable. Examples of the positive electrode active material having a proportion of Ni atoms of 60 mol % or more include NMC622 ($Li(Ni_{0.6}Co_{0.2}Mn_{0.2})O_2$, Ni: 60 mol %) and NMC811 ($Li(Ni_{0.8}Co_{0.1}Mn_{0.1})O_2$, Ni: 80 mol %).

Figure 1:
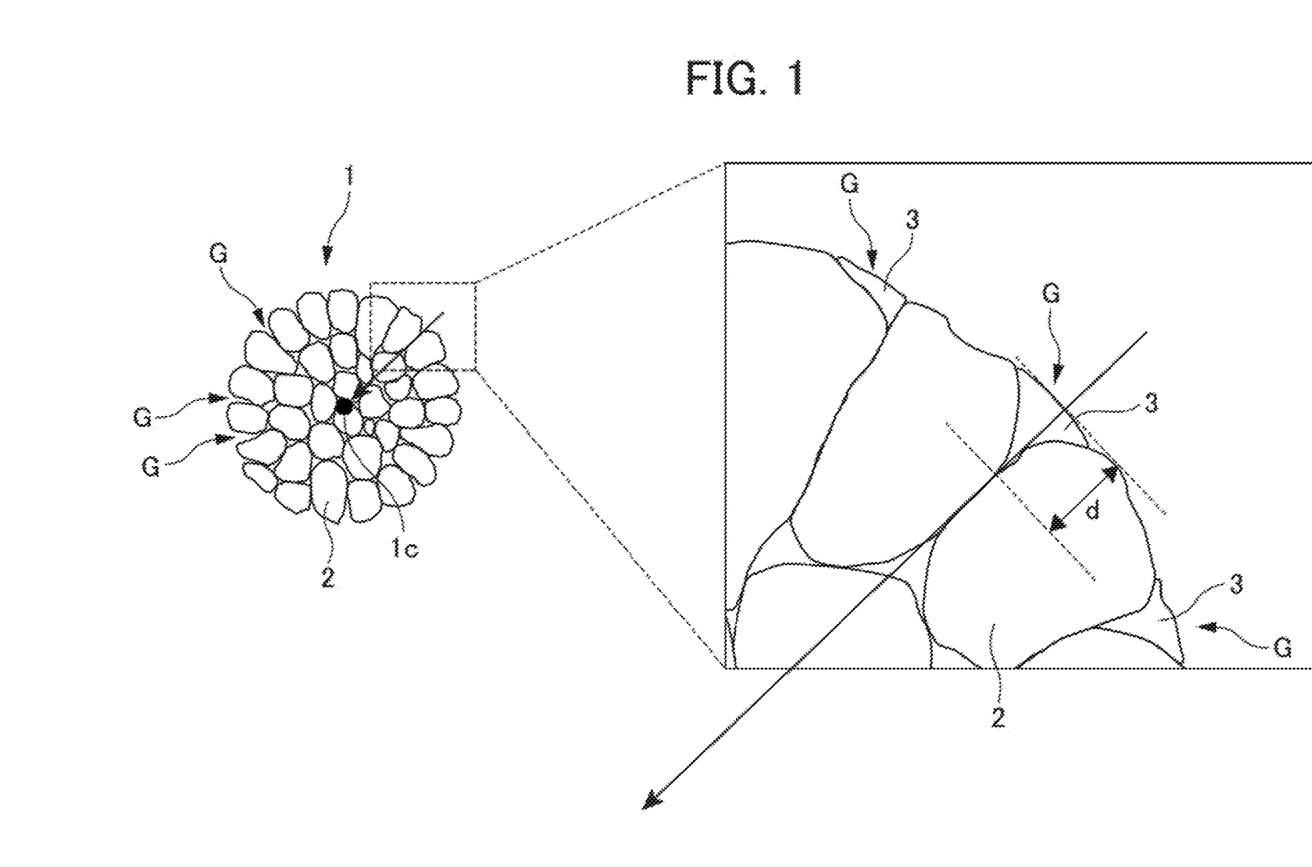
FIG. 1 is a schematic diagram showing a positive electrode active material according to the present embodiment.

The configuration of the positive electrode active material will be described with reference to FIG. 1, which is a schematic diagram. As shown in FIG. 1, a positive electrode active material 1 according to the present embodiment is an aggregate of lithium compounds 2, which are primary particles. A solid film 3 including a plurality of lithium salts is formed on a surface of particles of the positive electrode active material 1. A recess G is formed between lithium compounds 2 that are primary particles. The solid film 3 may fill the recess G or may coat the entire surface of particles of the positive electrode active material 1.

<<Solid Film>>

The solid film 3 prevents contact between the electrolytic solution and the positive electrode active material, and thereby suppresses decomposition of the electrolytic solution and deterioration of the positive electrode active material. Further, the solid film 3 has good lithium ion conductivity.

The solid film 3 includes a plurality of types of lithium salts. Examples of the lithium salts include fluorine compounds such as lithium fluoride (LiF), phosphorus compounds such as lithium metaphosphate ($LiPO_3$), and lithium carbonate ($Li_2CO_3$). It is preferable that the solid film 3 includes a fluorine compound such as lithium fluoride (LiF) and a phosphorus compound such as lithium metaphosphate ($LiPO_3$) as lithium salts. Including lithium fluoride (LiF) in the solid film 3 enables a thin and dense solid film 3 to be formed. Further, lithium fluoride (LiF) is stable at a high potential and thus can suppress decomposition of the solid film 3, which is preferable. Including lithium metaphosphate ($LiPO_3$) in the solid film 3 can reduce the reaction resistance, which is preferable.

The solid film 3 preferably contains 70 mol % or more of fluorine atoms with respect to the total number of moles of fluorine atoms and phosphorus atoms. This can suppress decomposition of the solid film 3 and an increase in the reaction resistance. In the solid film 3 formed in the recess G, it is preferable that the molar ratio of fluorine atoms to phosphorus atoms is greater than the molar ratio of the phosphorus atoms to the fluorine atoms. The atomic ratio in the solid film 3 can be measured by, for example, X-ray photoelectron spectroscopy (XPS).

The thickness of the solid film 3 is preferably 10 nm or more and 70 nm or less. When the thickness of the solid film 3 is 10 nm or more, an effect of preventing contact between the electrolytic solution and the positive electrode active material is preferably obtained. Further, when the thickness of the solid film 3 is 70 nm or less, cracking and peeling of the solid film 3 caused by a change in volume of the positive electrode active material can be suppressed. In this specification, the thickness of the solid film 3 is indicated by the thickness d in FIG. 1. The thickness d means the maximum thickness of the solid film 3 with respect to the surface of the positive electrode active material 1 that is in the form of particles when a perpendicular line (arrow in FIG. 1) is drawn from a tangent line of the surface of the positive electrode active material 1 to the center 1c of the positive electrode active material 1. The thickness can be measured with, for example, a transmission electron microscope (TEM).

It is preferable that the solid film 3 has a coverage rate of 30% to 70%, which is the proportion of the surface area of the recess G covered by the solid film 3 formed with respect to the entire surface area of the recess G.

[Negative Electrode Active Material]

The negative electrode active material is not limited, and for example, graphite is used. Examples of the graphite include soft carbon (easily graphitizable carbon) and hard carbon (non-graphitizable carbon). The graphite may be natural graphite or artificial graphite. One of the above may be used, or two or more of the above may be used in combination.

[Conductive Auxiliary Agent]

Examples of the conductive auxiliary agent used in the positive electrode active material layer or the negative electrode active material include carbon black such as acetylene black (AB) and Ketjen black (KB), carbon material such as graphite powder, and conductive metal powder such as nickel powder. One of the above may be used, or two or more of the above may be used in combination.

[Binder]

Examples of the binder used in the positive electrode active material layer or the negative electrode active material layer include a cellulose-based polymer, a fluorine-based resin, a vinyl acetate copolymer, and a rubber.

Specifically, as a binder when a solvent-based dispersion medium is used, polyvinylidene fluoride (PVdF), polyimide (PI), polyvinylidene chloride (PVdC), polyethylene oxide (PEO), or the like can be used. As a binder when an aqueous dispersion medium is used, styrene butadiene rubber (SBR), acrylic acid-modified SBR resin (SBR-based latex), carboxymethyl cellulose (CMC), polyvinyl alcohol (PVA), polytetrafluoroethylene (PTFE), hydroxypropylmethylcellulose (HPMC), fluorinated ethylene propylene copolymer (FEP), or the like can be used. One of the above may be used, or two or more of the above may be used in combination.

(Separator)

The separator is not limited, and examples of the separator include porous resin sheets (films, nonwoven fabrics, and the like) made of a resin such as polyethylene (PE), polypropylene (PP), polyester, cellulose, or polyamide.

(Electrolytic Solution)

The electrolytic solution may be composed of a nonaqueous solvent and an electrolyte. The concentration of the electrolyte is preferably in the range of 0.1 to 10 mol/L.

[Nonaqueous Solvent]

The nonaqueous solvent in included in the electrolytic solution is not limited, and examples thereof include aprotic solvents such as carbonates, esters, ethers, nitriles, sulfones, and lactones. Specifically, ethylene carbonate (EC), propylene carbonate (PC), diethyl carbonate (DEC), dimethyl carbonate (DMC), ethyl methyl carbonate (EMC), 1,2-dimethoxyethane (DME), 1,2-diethoxyethane (DEE), tetrahydrofuran (THF), 2-methyltetrahydrofuran, dioxane, 1,3-dioxolane, diethylene glycol dimethyl ether, ethylene glycol dimethyl ether, acetonitrile (AN), propionitrile, nitromethane, N,N-dimethylformamide (DMF), dimethyl sulfoxide, sulfolane, γ-butyrolactone, and the like may be used. One of the above may be used alone, or two or more of the above may be used in combination.

[Electrolyte]

Examples of the electrolyte included in the electrolytic solution include $LiPF_6$, $LiBF_4$, $LiClO_4$, $LiN(SO_2CF_3)$, $LiN(SO_2C_2F_5)_2$, $LiCF_3SO_3$, $LiC_4F_9SO_3$, $LiC(SO_2CF_3)_3$, $LiF$, $LiCl$, $LiI$, $Li_2S$, $Li_3N$, $Li_3P$, $Li_{10}GeP_2S_{12}$ (LGPS), $Li_3PS_4$, $Li_6PS_5Cl$, $Li_7P_2S_8I$, $Li_xPO_yN_x$ (x=2y+3z−5, LiPON), $Li_7La_3Zr_2O_{12}$ (LLZO), $Li_{3x}La_{2/3-x}TiO_3$ (LLTO), $Li_{1+x+y}Al_xTi_{2-x}(PO_4)_3$ (0≤x≤1, LATP), $Li_{1.5}Al_{0.5}Ge_{1.5}(PO_4)_3$ (LAGP), $Li_{1+x+y}Al_xTi_{2-x}SiyP_{3-y}O_{12}$, $Li_{1+x+y}Al_x(Ti,Ge)_{2-x}SiyP_{3-y}O_{12}$, and $Li_{4-2x}Zn_xGeO_4$ (LISICON). One of the above may be used alone, or two or more of the above may be used in combination.

<Method for Manufacturing Positive Electrode Active Material>

A method for manufacturing the positive electrode active material according to the present embodiment includes an immersion step of immersing a positive electrode active material in a lithium compound aqueous solution, a drying step, and a heat treatment step.

In the immersion step, for example, a $LiPF_6$ aqueous solution can be used as the lithium compound aqueous solution. Thus, a solid film composed of lithium salts including lithium fluoride (LiF) and lithium metaphosphate ($LiPO_3$) can be formed on the surface of the positive electrode active material.

In the drying step, by drying the positive electrode active material immersed in the lithium compound aqueous solution at a predetermined temperature, a solid film including a plurality of types of lithium salts is formed on the surface of particles of the positive electrode active material. Since the lithium compound aqueous solution remains in the recess of the surface of particles of the positive electrode active material after the drying step, fluoride ions and lithium atoms in the lithium compound aqueous solution are bonded to each other, and thus lithium fluoride (LiF) is generated. Accordingly, it is possible to manufacture a positive electrode active material having a high ratio of LiF in the recess.

In the heat treatment step, a positive electrode active material precursor obtained in the drying step is subjected to heat treatment, and thus a positive electrode active material is obtained. The heat treatment conditions are 200° C. to 400° C., and heat treatment can be carried out under an atmosphere including oxygen in air or the like.

Although a preferred embodiment of the present invention has been described above, the content of the present invention is not limited to the above-described embodiment, and can be modified as appropriate.

EXAMPLES

The content of the present invention will now be described in more detail based on examples. The content of the present invention is not limited to the content of the following examples.

<Fabrication of Positive Electrode Active Material>

Example 1

A powder of $Li_1Ni_{0.6}Co_{0.2}Mn_{0.2}O_2$ as a positive electrode active material was immersed in a $LiPF_6$ aqueous solution. The amount of $LiPF_6$ was set to 0.35 wt. with respect to the weight of the positive electrode active material. The above was dried while being stirred, and then subjected to heat treatment at 380° C., and thereby the positive electrode active material of Example 1 was obtained.

Example 2, Comparative Example 1

The positive electrode active material of Example 2 was obtained in the same manner as in Example 1, except that the amount of $LiPF_6$ with respect to the weight of the positive electrode active material was as shown in Table 1. In Comparative Example 1, immersion of the positive electrode active material in a $LiPF_6$ aqueous solution was not performed.

<Fabrication of Positive Electrode>

Positive electrodes were fabricated by using the positive electrode active materials of the above examples and comparative example. Acetylene black as a conductive auxiliary agent and polyvinylidene fluoride as a binder were premixed into N-methylpyrrolidone as a dispersion solvent, and thus a premixed slurry was obtained. Then, the positive electrode active material obtained as described above and the premixed slurry were mixed, the mixture was subjected to dispersion treatment, and thus a positive electrode paste was obtained. Subsequently, the obtained positive electrode paste was applied to an aluminum positive electrode current collector, and the resultant product was dried, pressurized, and then dried. Thus, a positive electrode including a positive electrode active material layer was fabricated.

<Fabrication of Negative Electrode>

Acetylene black as a conductive auxiliary agent and carboxy methylcellulose (CMC) as a binder were premixed. Subsequently, graphite as a negative electrode active material was mixed into the mixture, and the mixture was further premixed. Thereafter, water as a dispersion solvent was added, the mixture was subjected to dispersion treatment, and thus a negative electrode paste was obtained. Then, the obtained negative electrode paste was applied to a copper negative electrode current collector, and the resultant product was dried, pressurized, and then dried. Thus, a negative electrode including a negative electrode active material layer was fabricated.

(Fabrication of Lithium Ion Secondary Battery)

A laminate, in which a separator was interposed between the positive electrode and the negative electrode fabricated above, was introduced into a pouch-like container prepared by heat-sealing an aluminum laminate for secondary batteries (manufactured by Dai Nippon Printing Co., Ltd.). Then, an electrolytic solution was injected into each electrode interface. Subsequently, the container was depressurized to −95 kPa and sealed, and thus a lithium ion secondary battery was fabricated. As the separator, a polyethylene microporous membrane coated on one side with about 5 µm of alumina particles was used. As the electrolytic solution, a solution obtained by dissolving $LiPF_6$ as an electrolyte salt at a concentration of 1.2 mol/L in a mixed solvent obtained by mixing ethylene carbonate, ethyl methyl carbonate, and dimethyl carbonate in a volume ratio of 30:30:40 was used.

<Evaluation>

The following evaluations were performed using the positive electrode active materials of Examples 1 and 2 and Comparative Example 1 and the lithium ion secondary batteries fabricated with the positive electrode active materials of Examples 1 and 2 and Comparative Example 1.

[SEM and SEM-EDS Analyses]

Figure 2:
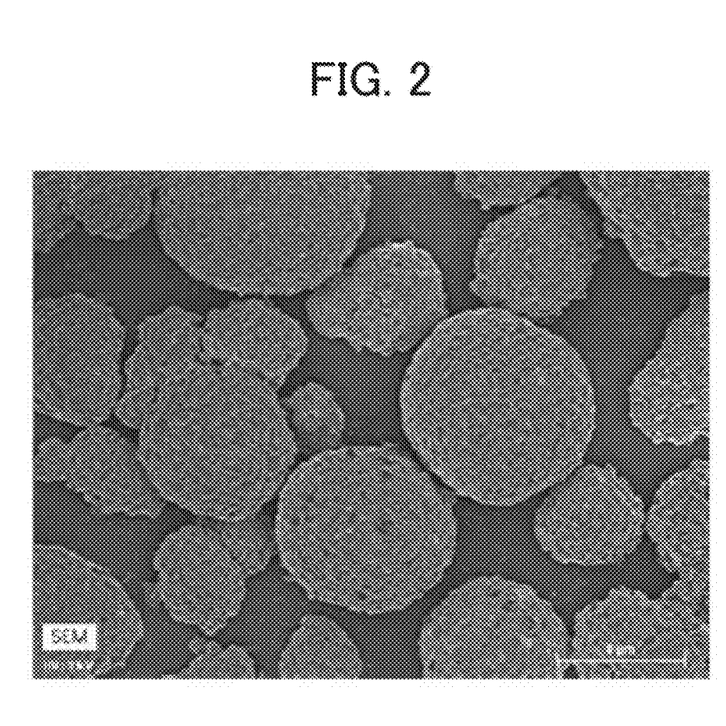
FIG. 2 is a scanning electron microscopy (SEM) image of a positive electrode active material according to an example.
Figure 3:
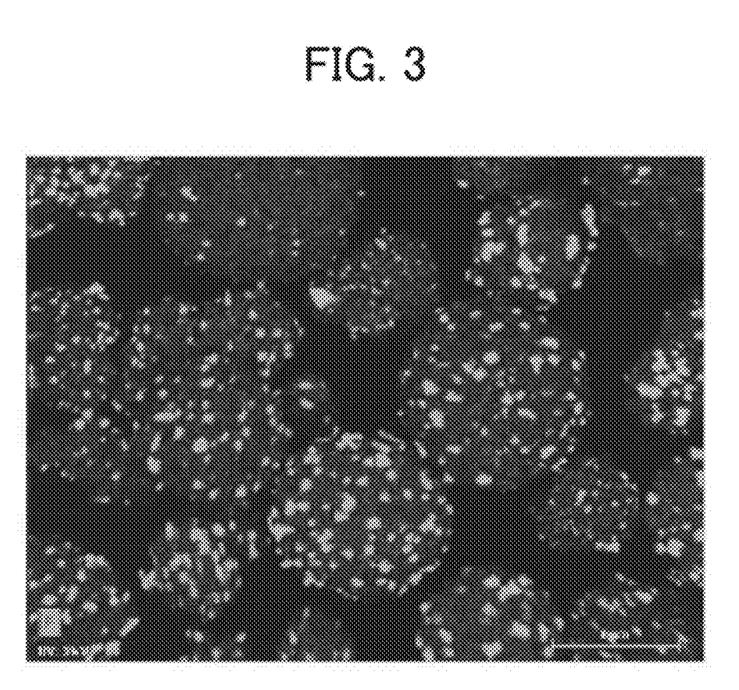
FIG. 3 is a scanning electron microscopy with energy dispersive X-ray spectroscopy (SEM-EDS) image showing the F distribution in the positive electrode active material according to the example.
Figure 4:
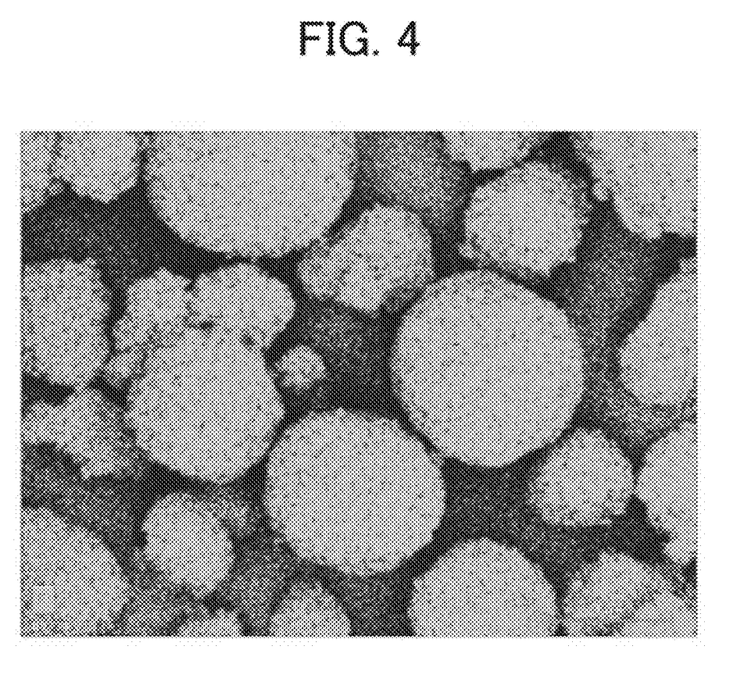
FIG. 4 is an SEM-EDS image showing the P distribution in the positive electrode active material according to the example.

A scanning electron microscopy (SEM) image result of the positive electrode active material of Example 1 is shown in FIG. 2. Scanning electron microscopy with energy dispersive X-ray spectroscopy (SEM-EDS) images of the positive electrode active material of Example 1 are shown in FIGS. 3 and 4. FIG. 3 shows the mapping result of F, and FIG. 4 shows the mapping result of P. From the mapping analysis result of F, it was confirmed that a large amount of F was distributed in the recess of the positive electrode active material. Further, from the mapping analysis result of P, it was confirmed that P was uniformly distributed on the surface of the positive electrode active material. SEM and SEM-EDS analyses were performed using an S4800 field emission scanning electron microscope (manufactured by Hitachi High-Tech Corporation). EDS elemental mapping was performed using a 5060FQ energy-dispersive X-ray spectroscope (manufactured by Bruker).

[XPS Analysis]

The proportions of F and P in the solid films of the positive electrode active materials of Examples 1 and 2 were measured by XPS analyses. The XPS analyses were performed using a K-Alpha+ XPS System (manufactured by Thermo Fisher Scientific). The results are shown in Table 1.

[Initial Film Thickness]

The thicknesses of the solid films of the positive electrode active materials of Examples 1 and 2 were measured with a transmission electron microscope (TEM). The TEM measurements were performed using an ARM-200F (manufactured by JEOL Ltd.). The results are shown in Table 1.

[Initial Discharge Capacity]

The lithium ion secondary batteries fabricated with the positive electrode materials of the examples and comparative example were left to stand at a measurement temperature of 25° C. for 1 hour, then were subjected to constant current charge at 8.4 mA to 4.2 V and subsequently to constant voltage charge at 4.2 V for 1 hour, then were left to stand for 30 minutes. Thereafter, the batteries were subjected to constant current discharge at a current value of 8.4 mA to 2.5 V. The above operation was repeated five times. The discharge capacity at the time of the fifth discharge was defined as the initial discharge capacity (mAh). The results are shown in Table 1. With respect to the discharge capacity obtained, the current value at which the discharge can be completed in 1 hour was defined as 1 C.

[Initial Cell Resistance]

The lithium ion secondary batteries after the measurement of the initial discharge capacity were left to stand at a measurement temperature of 25° C. for 1 hour, then charged at 0.2 C, adjusted to a state of charge (SOC) of 50%, and left to stand for 10 minutes. Then, the lithium ion secondary batteries were subjected to pulse discharge at a C rate of 0.5 C for 10 seconds, and the voltage at the time of the completion of the 10 second discharge was measured. The voltage at the time of the completion of the 10 second discharge was plotted with respect to the current at 0.5 C, with the horizontal axis being the current value, and the vertical axis being the voltage. Subsequently, after being left to stand for 10 minutes, the lithium ion secondary batteries were subjected to auxiliary charge to reset the SOC to 50%, and further left to stand for 10 minutes. The above operation was performed at C rates of 1.0 C, 1.5 C, 2.0 C, 2.5 C, and 3.0 C, and the voltage at the time of the completion of the 10 second discharge was plotted with respect to the current value at each C rate. The slope of the approximate straight line obtained from each plot by a least-squares method was defined as the initial cell resistance value (Ω) of the lithium ion secondary battery of the example. The results are shown in Table 1.

[Discharge Capacity after Durability Test]

As a charge-discharge cycle durability test, one cycle was defined as an operation of constant current charge at a charge rate of 1 C to 4.2 V, and subsequent constant current discharge at a discharge rate of 2 C to 2.5 V in a thermostated bath at 45° C. This operation was repeated 500 cycles. After the completion of the 500 cycles, the thermostated bath was set to 25° C., and the lithium ion secondary battery was left to stand for 24 hours, subjected to constant current charge at 0.2 C to 4.2 V, subjected to subsequent constant voltage charge at 4.2 V for 1 hour, and left to stand for 30 minutes. Subsequently, the battery was subjected to constant current discharge at a discharge rate of 0.2 C to 2.5 V, and the discharge capacity (mAh) after the durability test was measured. The rate of the discharge capacity after the durability test with respect to the initial discharge capacity was calculated as the capacity retention rate (%). The results are shown in Table 1.

[Cell Resistance after Durability Test]

Figure 5:
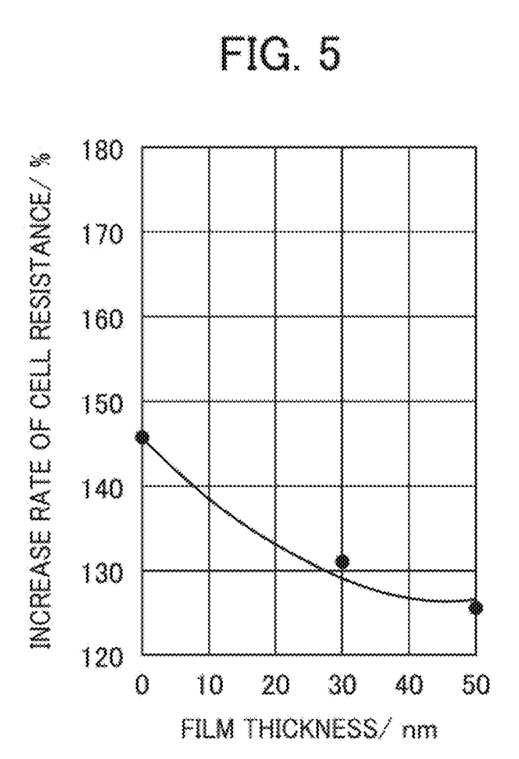
FIG. 5 is a graph showing the relationship between the thickness of the solid film and the resistance increase rate in examples.

The lithium ion secondary batteries after the measurement of the discharge capacity after the durability test were charged so as to become a state of charge (SOC) of 50% in the same manner as in the measurement of the initial cell resistance value, and the cell resistance value (Q) after the durability test was determined in the same manner as in the measurement of the initial cell resistance value. The results are shown in Table 1. The increase rate of cell resistance (M), which is the rate of the cell resistance value after the durability test with respect to the initial cell resistance value was calculated, and the relationship between the increase rate of cell resistance and the film thickness was plotted on a graph. The results are shown in FIG. 5.

TABLE 1

|  | Comparative Example 1 | Example 1 | Example 2 |
|---|---|---|---|
| $LiPF_6$ | — | 0.35 wt. % | 0.7 wt. % |
| Initial discharge capacity (mAh) | 44.3 | 44.2 | 44.6 |
| Discharge capacity after durability test | 38.3 | 38.2 | 38.8 |
| Capacity retention rate (%) | 86.4 | 86.4 | 86.9 |
| Initial cell resistance (Ω) | 1.21 | 1.1 | 1.06 |
| Cell resistance after durability test (Ω) | 1.78 | 1.44 | 1.33 |
| Increase rate of cell resistance (%) | 145.8 | 131.1 | 125.6 |
| Initial film thickness (TEM, nm) | — | 30 | 50 |
| F:P (XPS) Atomic ratio | — | 3.20:1 | 3.52:1 |
| Proportion of F (%) | — | 76.2 | 77.9 |

From the results in Table 1, it was confirmed that the lithium ion secondary batteries according to the examples each had a higher capacity retention rate, a lower resistance increase rate, and a lower initial cell resistance than the lithium ion secondary battery according to the comparative example. That is, it was confirmed that the lithium ion secondary batteries according to the examples each had desirable cycle characteristics and a desirable discharge capacity.

EXPLANATION OF REFERENCE NUMERALS

1 positive electrode active material
2 lithium compound (primary particles)
3 solid film

What is claimed is:

1. A positive electrode active material that is an aggregate of lithium compounds each comprising a lithium-containing transition metal oxide,
   the positive electrode active material comprising particles having a surface on which a solid film comprising lithium fluoride (LIF) and lithium metaphosphate ($LIPO_3$) is formed,
   the solid film having a thickness of 30 nm or more and 70 nm or less,
   wherein the thickness of the solid film means a maximum thickness of the solid film with respect to the surface of the particles of the positive electrode active material when a perpendicular line is drawn to a center of the positive electrode active material, and
   wherein the solid film contains 70 mol % or more of fluorine atoms with respect to a total number of moles of the fluorine atoms and phosphorus atoms.

2. The positive electrode active material according to claim 1, wherein the lithium-containing transition metal oxide comprises 60 mol % or more of nickel atoms with respect to transition metal.

3. A positive electrode active material that is an aggregate of lithium compounds each comprising a lithium-containing transition metal oxide,
   the positive electrode active material comprising particles having a surface on which a solid film comprising lithium fluoride (LIF) and lithium metaphosphate ($LIPO_3$) is formed,
   the solid film having a thickness of 30 nm or more and 70 nm or less,
   wherein the thickness of the solid film means a maximum thickness of the solid film with respect to the surface of the particles of the positive electrode active material when a perpendicular line is drawn to a center of the positive electrode active material, and
   wherein a molar ratio of fluorine atoms to phosphorus atoms is greater than a molar ratio of the phosphorus atoms to the fluorine atoms, in the solid film formed in a recess of the surface of the particles of the positive electrode active material.

4. The positive electrode active material according to claim 3, wherein the lithium-containing transition metal oxide comprises 60 mol % or more of nickel atoms with respect to transition metal.

\* \* \* \* \*